US012596717B1

(12) United States Patent
Zhou et al.

(10) Patent No.:  US 12,596,717 B1
(45) Date of Patent:  Apr. 7, 2026

(54) PARTITION ADVISOR FOR CLOUD-BASED DATABASE SYSTEMS

(71) Applicant: SAP SE, Walldorf (DE)

(72) Inventors: Haotian Zhou, Xi'an (CN); Zhe Qu, Xi'an (CN); Jing He, Xi'an (CN); Yu Ma, Xi'an (CN); Fu-Qiang Lv, Xi'an (CN); Xiaotao Wang, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/969,358

(22) Filed: Dec. 5, 2024

(51) Int. Cl.
    *G06F 16/24* (2019.01)
    *G06F 16/2455* (2019.01)
(52) U.S. Cl.
    CPC ............................... *G06F 16/24554* (2019.01)
(58) Field of Classification Search
    CPC .................................................. G06F 16/24554
    See application file for complete search history.

(56) References Cited

U.S. PATENT DOCUMENTS

| | | | |
|---|---|---|---|
| 11,741,127 B2 | 8/2023 | Liu et al. | |
| 12,141,139 B2 | 11/2024 | Wang et al. | |
| 2023/0297573 A1* | 9/2023 | Oswal ............... | G06F 16/24542 |
| | | | 707/714 |

OTHER PUBLICATIONS

"Learning a Partitioning Advisor for Cloud Databases", Hilprecht et al., Porland, OR, USA, SIGMOD Jun. 14-19, 2020.*

* cited by examiner

*Primary Examiner* — Ajay M Bhatia
*Assistant Examiner* — Cindy Nguyen
(74) *Attorney, Agent, or Firm* — Fish & Richardson P.C.

(57) ABSTRACT

Methods, systems, and computer-readable storage media for, for a historical query, determining a set of columns, for at least a sub-set of columns, generating a first set of feature vectors, each feature vector being associated with a label indicating a partition type, providing a partition recommendation model by training using a plurality of sets of feature vectors that includes the first set of feature vectors, receiving a slow query that is executed in the cloud-based database system, generating a second set of feature vectors representative of respective columns implicated by the slow query, and for a first feature vector in the second set of feature vectors, processing the first feature vector by the partition recommendation model to provide a first set of partition recommendations, and implementing a first partition recommendation of the first set of partition recommendations as a first partition in the cloud-based database system.

19 Claims, 6 Drawing Sheets

Figure 3A:
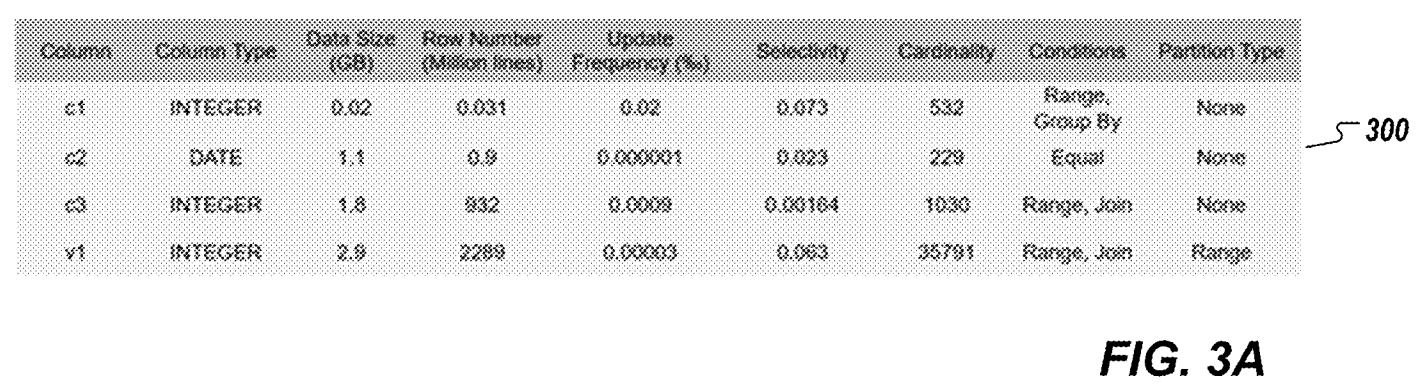

| Column | Column Type | Data Size (GB) | Row Number (Million Rows) | Update Frequency | Skewness | Cardinality | Operations | Partition Type |
|---|---|---|---|---|---|---|---|---|
| c1 | INTEGER | 0.02 | 0.031 | 0.02 | 0.073 | 532 | Range, Group By | None |
| c2 | DATE | 1.1 | 0.9 | 0.000001 | 0.003 | 229 | Equal | None |
| c3 | INTEGER | 1.8 | 832 | 0.0009 | 0.00164 | 1038 | Range, Join | None |
| v1 | INTEGER | 3.9 | 32899 | 0.00003 | 0.993 | 35791 | Range, Join | Range |

PARTITION ADVISOR FOR CLOUD-BASED DATABASE SYSTEMS

BACKGROUND

Enterprises can use enterprise applications to support and execute operations. Enterprise applications can be deployed in cloud computing environments, which includes execution of the enterprise applications within a data center of a cloud-computing provider (e.g., as part of an infrastructure-as-a-service (IaaS) offering). Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). In some instances, clients (e.g., client-side computing devices) transmit requests to a cloud computing environment, which requests are routed to a server for processing.

SUMMARY

Implementations of the present disclosure are directed to partitioning in cloud-based database systems. More particularly, implementations of the present disclosure are directed to a partition advisor for partitioning in cloud-based database systems.

In some implementations, actions include, for a historical query in a set of historical queries, determining a set of columns, the set of historical queries including queries that have been executed in a cloud-based database system, for at least a sub-set of columns of the set of columns, generating a first set of feature vectors, each feature vector in the first set of feature vectors being associated with a label indicating a partition type, providing a partition recommendation model by training using a plurality of sets of feature vectors that includes the first set of feature vectors, receiving a slow query that is executed in the cloud-based database system, generating a second set of feature vectors representative of respective columns implicated by the slow query, and for a first feature vector in the second set of feature vectors, processing the first feature vector by the partition recommendation model to provide a first set of partition recommendations, and implementing a first partition recommendation of the first set of partition recommendations as a first partition in the cloud-based database system. Other implementations of this aspect include corresponding systems, apparatus, and computer programs, configured to perform the actions of the methods, encoded on computer storage devices.

These and other implementations can each optionally include one or more of the following features: implementing a first partition recommendation of the first set of partition recommendation as a first partition in the cloud-based database system comprises determining that a probability associated with the first partition recommendation exceeds a threshold probability, and in response, outputting the first partition recommendation for implementation in the cloud-based database system; implementing a first partition recommendation of the first set of partition recommendation as a first partition in the cloud-based database system includes processing each partition recommendation using a sample library to generate a set of execution results, the sample library being representative of data stored within the cloud-based database system, and selecting the first partition recommendation from the first set of partition recommendations based on the execution results; actions further include, for a second feature vector in the second set of feature vectors, processing the second feature vector by the partition recommendation model to provide a second set of partition recommendations, and determining not to implement any partition recommendations of the second set of partition recommendations in the cloud-based database system; each feature vector includes an encoded representation of features of a respective column, in which each dimension corresponds to a feature, each feature including one or a static feature and a dynamic feature; each feature vector is generated using one-hot encoding; the slow query is designated as slow in response to determining that a query execution time exceeds a threshold query execution time; the partition recommendation model is a random forest model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3A depicts example column data for an example query.

Like reference symbols in the various drawings indicate like elements.

DETAILED DESCRIPTION

Figure 1:
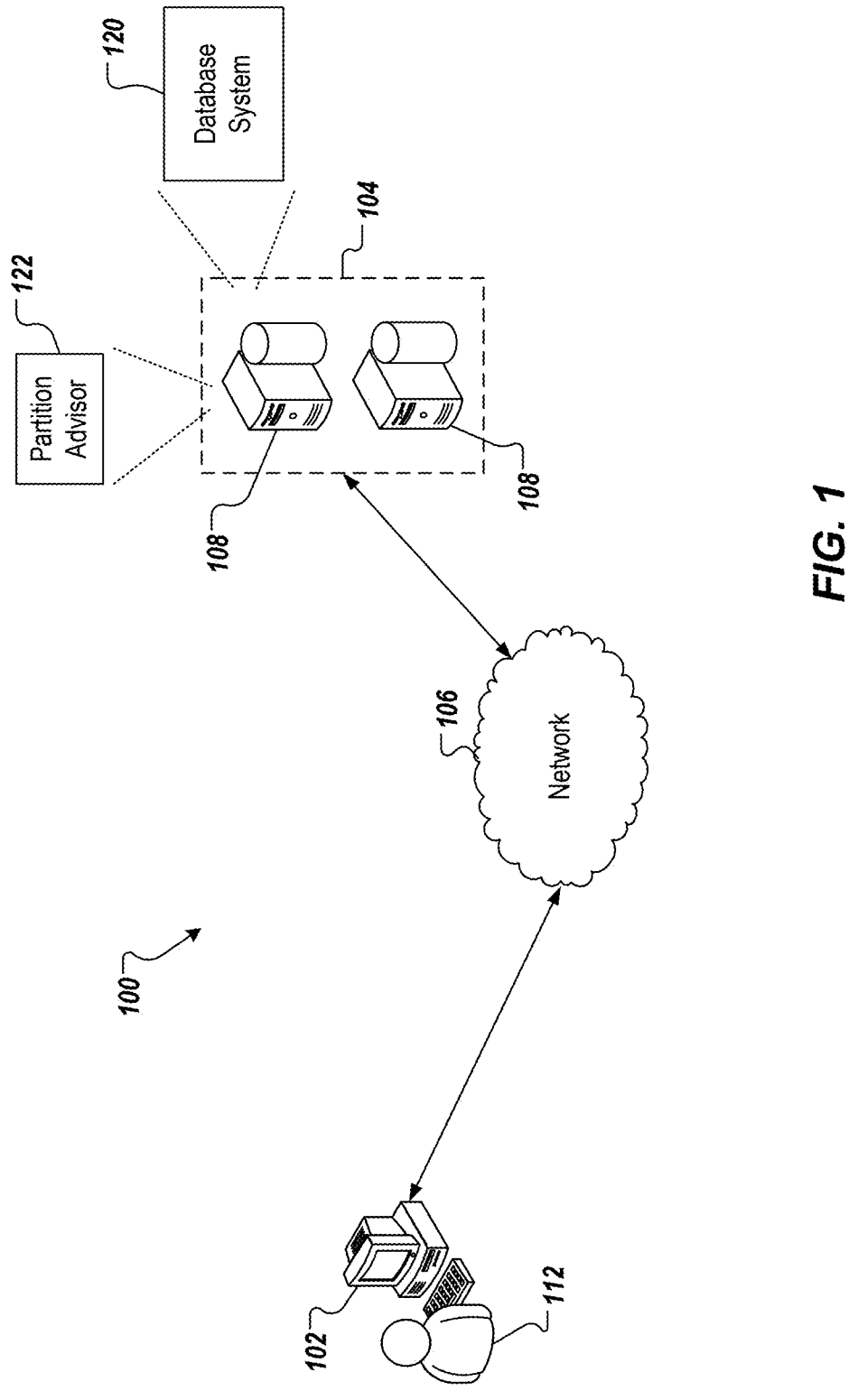
FIG. 1 depicts an example architecture that can be used to execute implementations of the present disclosure.

Implementations of the present disclosure are directed to partitioning in cloud-based database systems. More particularly, implementations of the present disclosure are directed to a partition advisor for partitioning in cloud-based database systems.

Implementations can include actions of for a historical query in a set of historical queries, determining a set of columns, the set of historical queries including queries that have been executed in a cloud-based database system, for at least a sub-set of columns of the set of columns, generating a first set of feature vectors, each feature vector in the first set of feature vectors being associated with a label indicating a partition type, providing a partition recommendation model by training using a plurality of sets of feature vectors that includes the first set of feature vectors, receiving a slow query that is executed in the cloud-based database system, generating a second set of feature vectors representative of respective columns implicated by the slow query, and for a first feature vector in the second set of feature vectors, processing the first feature vector by the partition recommendation model to provide a first set of partition recommendations, and implementing a first partition recommendation of the first set of partition recommendations as a first partition in the cloud-based database system.

To provide context for implementations of the present disclosure, there has been an increasing trend of enterprises migrating their systems to cloud-based solutions. This transition has placed the performance of cloud-based systems at the forefront of customer satisfaction metrics. For example, enterprises can use cloud-based database systems in support of enterprise operations. In this context, data of an enterprise can be stored in a cloud-based database system and can be queried to return query results that can be used in furtherance of enterprise operations. For example, a query (e.g., a structured query language (SQL) query) can be used to query the database system to return data in a query result that is responsive to the query.

Querying cloud-based database systems incurs costs in terms of time and technical resources. For example, a query incurs an execution time, during which the query is consuming technical resources of the database system to generate the query result. In an effort to enhance performance, database systems can implement partitioning, which can be described as separating data into partitions. For example, data is stored in tables, where a column represents a type of data value and rows represent records across one or more columns. In some examples, partitions can be based on columns, referred to as partitioning columns. By partitioning tables into smaller, individual tables, response times and consumption of technical resources are decreased, because there is less data that is scanned in responding to queries. However, determining which columns to use for partitioning is a non-trivial task and which columns are selected has a significant influence on performance.

Traditional database management, predominantly overseen by database administrators (DBAs), involves substantial manual intervention. This manual approach to managing and maintaining databases is not only labor-intensive, but also prone to errors. Such errors can have significant, negative consequences on uptime, performance, and security of the database system. Within the sphere of autonomous databases, a pivotal feature is the capability for self-management and automatic updating of partitions. Efficient partitioning is instrumental in enhancing performance of database systems, thereby addressing the need for more reliable and efficient cloud-based database systems.

In view of the above context, implementations of the present disclosure provide a partitioning advisor that leverages one or more ML models to generate partition recommendations for database systems. In some examples, a partition recommendation includes a column partition that can be implemented within a database system. As described in further detail herein, the partitioning advisor of the present disclosure provides, for each column, a feature vector that is used to assess the column for partitioning. Each feature vector includes static features and dynamic features of a respective column, which collectively inform the decision-making process for establishing the most effective partitioning strategy. More particularly, the feature vectors are processed to determine whether a partition is needed for a column and, if so, a type of partition that should be applied to the column.

In accordance with implementations of the present disclosure, and as described in detail herein, the partition advisor leverages a ML model, referred to herein as a partition recommendation model. During a training phase, the partition recommendation model is trained using training data that is based on feature vectors representative of columns of a database system and on queries that had been previously executed by the database system. During an inference phase, and in response to one or more queries that are determined to be slow queries, the partition recommendation model provides a set of partition recommendations, and a partition recommendation can be selected from the set of partition recommendations to implement within the database system.

As described herein, the partition advisor of the present disclosure leverages the observation that slow queries resulting from inadequate partitioning in one database often mirror scenarios in other databases. In instances where column statistics and associated query patterns are comparable, implementing partitions at analogous locations can yield similar performance enhancements. To capitalize on this insight, implementations of the present disclosure accurately characterize existing partition scenarios to train the partition recommendation model and employ the partition recommendation model to recommend effective partition strategies. This process involves a detailed analysis of historical partitioning and identifying patterns and correlations that can inform the partition recommendation model. By doing so, the partition advisor of the present disclosure can autonomously generate tailored partition plans, addressing the specific needs of each query and overall system performance, thereby transforming the approach to managing large-scale cloud-based database systems.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a database system 120 that can store data of one or more enterprises. In some examples, the database system 120 implements partitioning of tables based on columns. In the example of FIG. 1, the server system 104 can host a partition advisor 122 in accordance with implementations of the present disclosure. As described in further detail herein, the partition advisor provides partition recommendations for implementation in the database system 120. That is, tables stored within the database system 120 can be partitioned using partition recommendations provided by the partition advisor 122. In some examples, the partition advisor 122 continuously monitors execution times of queries processed by the database system 120 to generate partition recommendations. In this manner, the partition advisor 120 enables continuous, automated updating of partitions in the database system 120.

Figure 2:
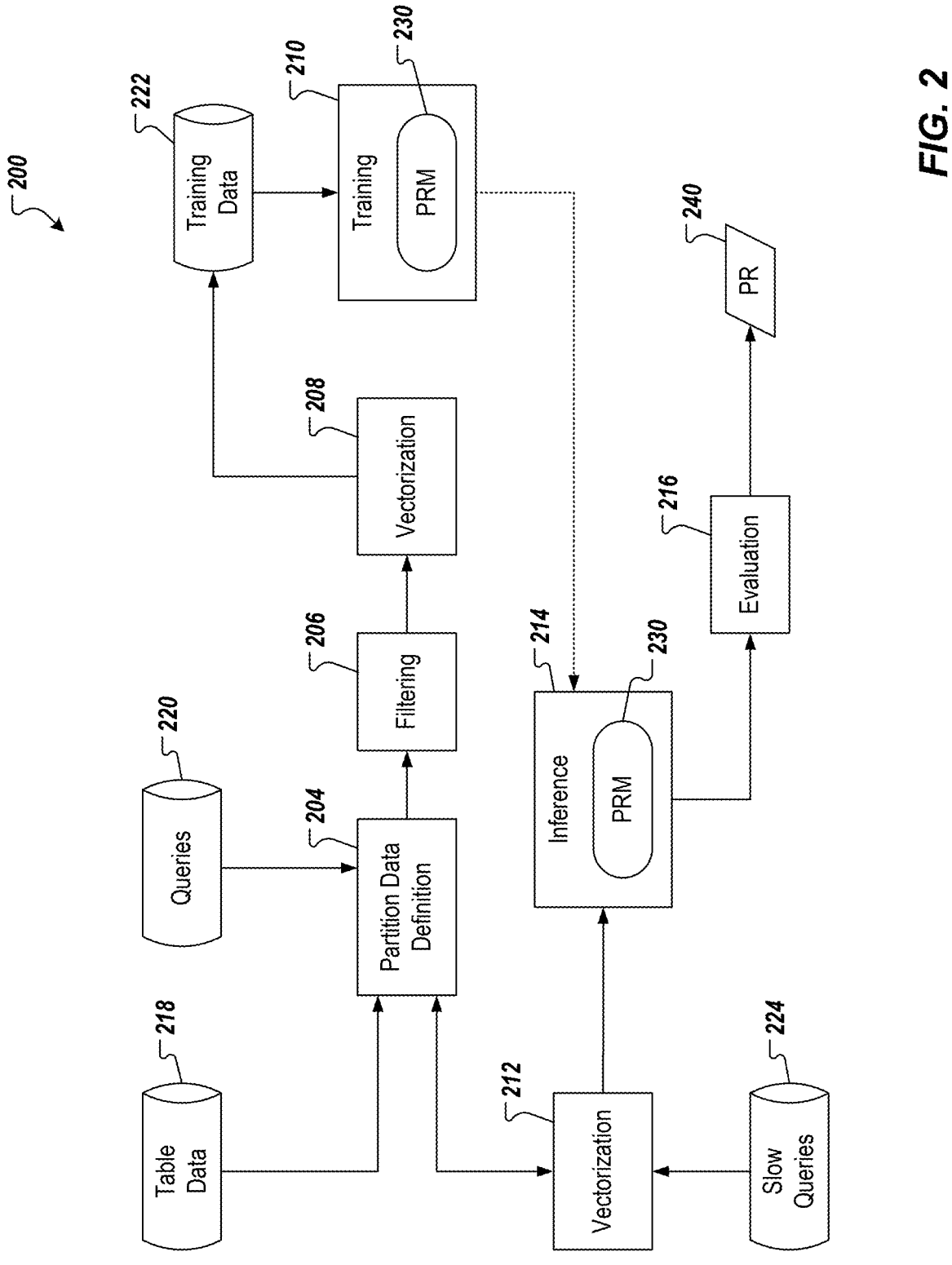
FIG. 2 depicts an example conceptual architecture in accordance with implementations of the present disclosure.

FIG. 2 depicts an example conceptual architecture 200 in accordance with implementations of the present disclosure. In the example of FIG. 2, the conceptual architecture 200 includes a partition data definition module 204, a filtering module 206, a vectorization module 208, a training module 210, a vectorization module 212, an inference module 214, an evaluation module 216, a table data repository 218, a query repository 220, a training data repository 222, and a slow query repository 224. In some examples, at least a portion of the conceptual architecture 200 can include the partition advisor of the present disclosure. For example, the partition advisor of the present disclosure can include at least the vectorization module 212, the inference module 214 and the evaluation module 216.

As described in further detail herein, the training module 210 trains a partition recommendation model (PRM) 230 based on column data stored in the table data repository 224 and queries stored in the query repository 220. The table data repository 218 stores data representative of tables of a database system, for which partition recommendations are to be provided. The query repository 220 stores queries that had been previously executed in the database system (historical queries). The PRM 230 is deployed to the inference module 214 to generate a set of partition recommendations that are evaluated by the evaluation module 216 to provide a partition recommendation 240. In some examples, partition recommendations in the set of partition recommendations are provided in response to one or more queries that are determined to be slow queries (e.g., an execution time exceeds a threshold execution time).

As introduced above, and described in further detail herein, for each column, a feature vector is provided to assess the column. Each feature vector is composed of both static features and dynamic features of a respective column.

Tables 1 and 2, below, outline example features that are used to provide a structured approach to data collection and analysis.

TABLE 1

| Example Static Features of Columns | |
| --- | --- |
| Static Feature | Explanation |
| Column Type | The data type for a column. |
| Range | Range query occurs or not. |
| Equal | Equal query occurs or not. |
| Join | Join query occurs or not. |
| Group By | Group by condition occurs or not. |
| Aggregate Function | The number of aggregate functions that are used. |
| Partition Type | The type of existing partition applied for the column. |

In further detail, Column Type indicates the data type of data that is stored in a column, which plays a significant role in determining the appropriate partition strategy. Range indicates whether range queries are executed on the column. Equal indicates whether equal queries occur on the column. Join and Group By Associations indicate whether the column is involved in join or group by operations within a where clause, which impacts decision on partitioning. Aggregate Function indicates whether aggregate functions are used on the column. Partition Type indicates a partition type for the column, if any.

TABLE 2

| Example Dynamic Features of Columns | |
| --- | --- |
| Dynamic Feature | Explanation |
| Data Size | The space that the column consumes. |
| Row Number | The total row number for the column. |
| Update Frequency | Indicates how frequently data is modified. |
| Selectivity | The ratio of data that has been selected to the total data. |
| Cardinality | The number of distinct values in the column. |

Here, dynamic features change over time as, for example, data is added to, removed from, and or modified within a table. In further detail, Data Size, Row Number, and Update Frequency respectively provide an overview of the data volume, row count, and how often the data in a column is updated. These factors are important in understanding the growth and modification trends of data stored in a column. Selectivity is the ratio of the data selected by queries to the total data in a column, also an important factor in determining how queries impact different portions of the data. In some examples, Update Frequency and Cardinality are calculated by the partition data definition module 204. Cardinality refers to the number of distinct values within a column. High cardinality can indicate the need for more refined partitioning strategies, for example.

Both static features and dynamic features collectively offer a comprehensive view of the data characteristics and querying patterns. This detailed understanding enables the PRM 130 to be trained to output informed, precise recommendations for partitioning during inference. In this manner, query performance can be optimized to reduce workload inefficiencies in the cloud-based database system. That is, consumption of technical resources and time to execute queries can be reduced, as described in further detail herein.

Referring again to FIG. 2, the partition data definition module 204 processes queries stored in the query repository 220, retrieves values of features of columns represented in the queries, determines values of features, and provides a column feature table. In some examples, the column feature table only represents columns that have a data type and/or a partition type that is supported for partition recommendations. Examples of supported partition types include RANGE, HASH, ROUNDROBIN, RANGE-RANGE, RANGE-HASH, HASH-RANGE, HASH-HASH, ROUN-DROBIN-HASH, RANGE-RANGE-RANGE, RANGE-RANGE-HASH. Examples of supported column types include, for Range and Hash, DATE, SECONDDATE, TIMESTAMP, TINYINT, SMALLINT, INTEGER, BIGINT, DECIMAL(p,s), BOOLEAN, VARCHAR, NVARCHAR, VARBINARY, SHORTTEXT, and, for Round-Robin, all column types.

To illustrate implementations of the present disclosure, the following query statement (SQL statement) can be considered as a non-limiting example:

SELECT * FROM customer, vendor WHERE c1>10
AND c2='2024-01-01' AND c3<v1 GROUP BY c1
Listing 1: Example Query Statement (SQL1)

Here, SQL1 involves columns c1, c2, and c3 of a customer table, and a column v1 of a vendor table. In processing SQL1, the partition data definition module 204 populates a column feature table with values of features for c1, c2, c3, and v1. FIG. 3A depicts a non-limiting example of a column feature table 300 that can be provided based on SQL1. In the example of FIG. 3A, the column v1 has a range partition and the other columns have no partition.

In some implementations, the filtering module 206 processes the column feature table to selectively filter columns therefrom. For example, columns can be filtered based on data size and/or row numbers by comparing to respective thresholds. By way of non-limiting example, a column having a data size that does not meet or exceed a data size threshold (e.g., 1 GB) can be filtered, and/or a column having a row number that does not meet or exceed a threshold row number (e.g., 1 million) can be filtered from the column feature table. As such, and if any columns are filtered from the column feature table, the column feature table can be referred to as a filtered column feature table. In the example of FIG. 3A, the column c1 can be filtered from the column feature table to provide a filtered column feature table.

Figure 3B:
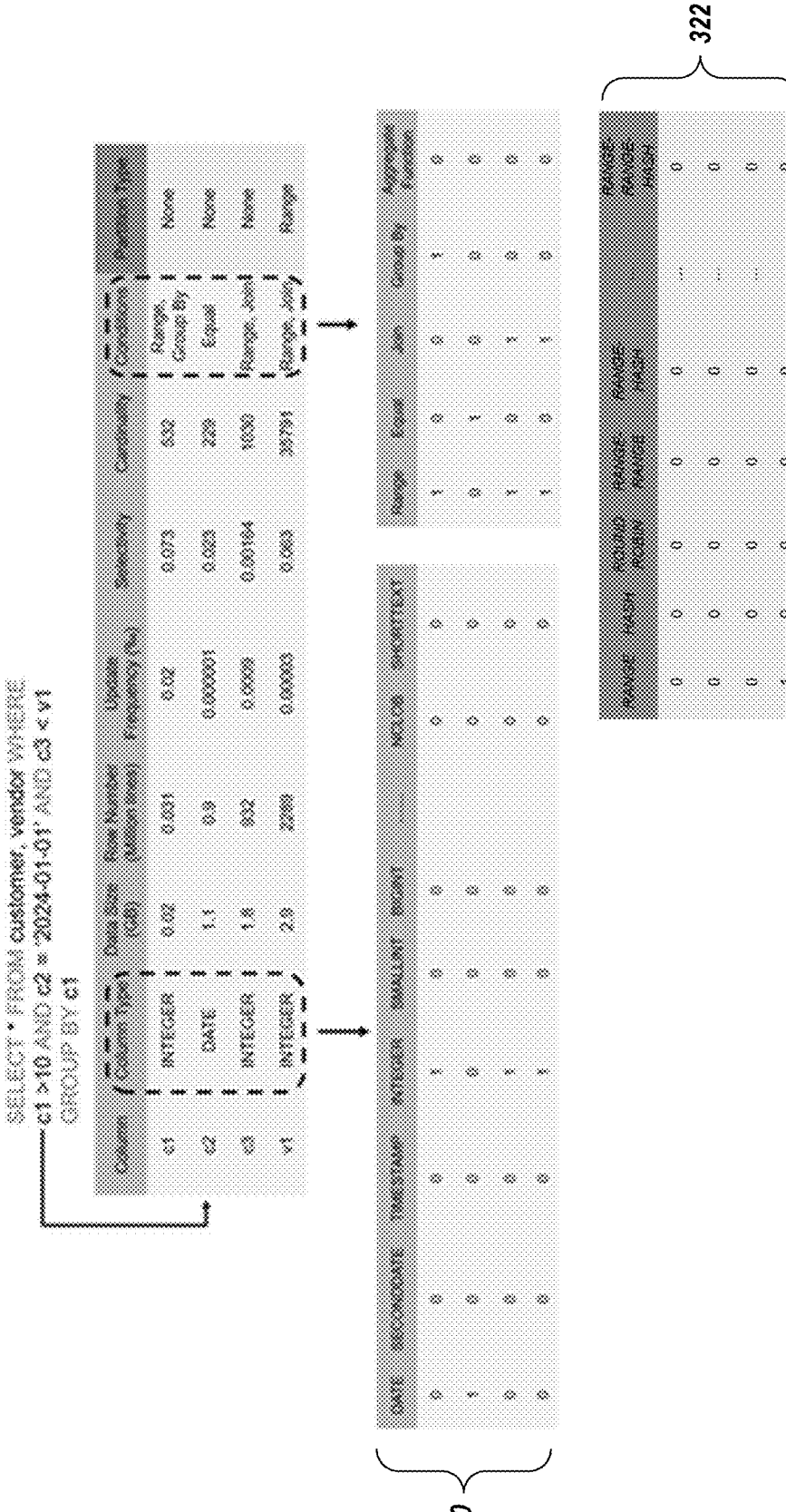
FIG. 3B depicts example filtering and vectorization in accordance with implementations of the present disclosure based on the example column data of FIG. 3A.

In some implementations, the (filtered) column feature table is processed by the vectorization module 208, which generates and labels feature vectors for each query to provide training data that is stored in the training data repository 222. In some examples, each feature vector is provided as a multi-dimensional vector, each dimension corresponding to a static feature or a dynamic feature of a respective column. In some examples, each feature vector is provided as a one-hot feature vector, in which, if a static feature or a dynamic feature is present for the respective column, a respective dimension is encoded with 1 and, if a static feature or a dynamic feature is absent for the respective column, a respective dimension is encoded with 0. FIG. 3B depicts an example of providing a set of feature vectors based on the column feature table 300 of FIG. 3A, which results in a set of feature vectors 320 and respective label vectors 322 (e.g., one-hot encoded). That is, each feature vector can be labeled with a partition label (e.g., NONE for the feature vectors of columns c1, c2, c3, RANGE for the feature vector of column v1).

It should be noted that, the column c1 would be filtered from consideration, as discussed above. However, a feature vector for c1 is represented in the examples of FIGS. 3A and 3B to depict a one-to-one correspondence between columns in the example of SQL1 and the uniformization result. It is contemplated, however, that a feature vector for the column c1 would not be generated in practice.

During a training phase, the PRM 230 is trained by the training module 210 using training data stored in the training data repository 222. In some examples, the PRM 230 is trained as a random forest (RF) model, which is particularly well-suited for handling complexities of feature vectors representing column partitions. It is contemplated, however, that implementations of the present disclosure can be realized using any appropriate training algorithm. It can be noted that, by employing RF, the PRM 230 can handle the multi-dimensional nature of the column data and provide robust, reliable partitioning recommendations. This approach enhances the decision-making process, leading to optimized database performance and efficient query processing in cloud-based database systems, as described herein.

In some examples, the training process is based on feature vectors and the labels assigned thereto. Here, and as described above, a feature vector is a multi-dimensional representation of a column and a label indicates a partition applied to the column (e.g., NONE, RANGE in the example of FIG. 3B). During training, the PRM 230 learns from the feature vectors by identifying patterns, correlations, and insights from the feature vectors. More particularly, and during iterations of training, the PRM 230 processes feature vectors as input and, for each feature vector, predicts a class from a set of classes. In some examples, each class in the set of classes is a partition that can be applied to columns. If, for a feature vector, the predicted partition does not match the label assigned to the feature vector, further iterations of training can be executed. Ideally, the PRM 230 is trained to accurately predict partitions of at least a threshold number of feature vectors in the training data.

After training is complete, the PRM 230 is deployed to the inference module 214 to provide partition recommendations, as described in further detail herein. For example, a copy of the (trained) PRM 230 can be executed by the inference module 214.

In some implementations, production use of a database system can be monitored, during which execution times for queries can be monitored to selectively designate queries as slow queries. In some examples, for each query executed within the database system, an execution time can be compared to a threshold execution time. If the execution time exceeds the threshold execution time, the query can be designated as a slow query and can be recorded in the slow query repository 224.

For one or more slow queries in the slow query repository 224, a set of partition recommendations is provided. In some implementations, columns that are implicated in the query (e.g., columns c1, c2, c3, v1) are determined and, for each column, a feature vector is provided. For example, the vectorization module 212 can determine a set of columns (e.g., one or more columns) implicated by the query and can request (e.g., from the partition data definition module 204), for each column, column feature data (e.g., such as that represented in FIG. 3A). The vectorization module 212 can provide, for each column, a feature vector. For example, the feature vectors are of the same structure and dimensionality as the feature vectors generated by the vectorization module 208 for providing the training data. Accordingly, the feature vectors generated by the vectorization module 212 are multi-dimensional (one-hot) representations of columns implicated by slow queries.

In some implementations, each feature vector is processed by the PRM 230 executed by the inference module 214. In some examples, the PRM 230 outputs a set of classes, each class corresponding to a partition recommendation. In some examples, each class in the set of classes is associated with a respective probability provided by the PRM 230. Here, a probability represents a degree of likelihood that a respective class is correct. In some examples, classes in the set of classes are provided in rank order from high to low. If the highest ranked class has a probability that meets or exceeds a threshold probability (e.g., 66%), that class is output as a partition recommendation for evaluation by the evaluation module 216 (e.g., the partition recommendation 240 of FIG. 2). If the highest ranked class does not have a probability that meets or exceeds the threshold probability (e.g., 66%), the top X classes (e.g., top 3 classes) are output as a sub-set of classes for evaluation by the evaluation module 216.

In some implementations, the evaluation module 216 evaluates partition recommendations to determine, for each partition recommendation, an estimated performance. For example, the evaluation module 216 can include a sample library that can be described as a scaled-down version of the database system that the slow query resulted from. In some examples, the library contains a sub-set of data that retains the same static and dynamic features as the original database. In some examples, for each query, the sample library includes relevant tables and columns. For example, data for the columns can be selected as random sample. By using a <tablesample_clause> (e.g., SELECT * FROM "<SCHE-MA_NAME>". "<TABLE NAME>" TABLESAMPLE SYSTEM(10)) for example, a percentage (e.g., 10%) of the data can be returned for a table. As such, the sample library can include, for each table, a sub-set of data. In some examples, random sampling can ensure the data distribution and dynamic features are as close as possible as the original data source. For update frequency, it can be assumed that the update frequency is the same as the original, because the same workload is being considered. Of course, the data size and row count will be smaller, but other dynamic features will be the same. For this query, the where clause and data comparison method are unchanged, so the static feature is settled. This makes a sample library for the database system.

In some implementations, the evaluation module 216 provides a set of partitions for the column that is in question (i.e., the column of the slow query that the partition recommendations are provided for) using the recommended partitions. In some examples, the evaluation module 216 executes the slow query on the sample library using each recommended partition to provide, for each recommended partition, an execution time. In some examples, the execution times are compared to the execution time that had originally resulted in the slow query being designated as slow, referred to herein as the original execution time. In some examples, if no execution time provides an improvement over the original execution time, no partition recommendation is made. In some examples, if at least one execution time provides an improvement over the original execution time, the recommended partition that provides the greatest performance improvement is output as the partition recommendation (e.g., the partition recommendation 240).

Figure 4:
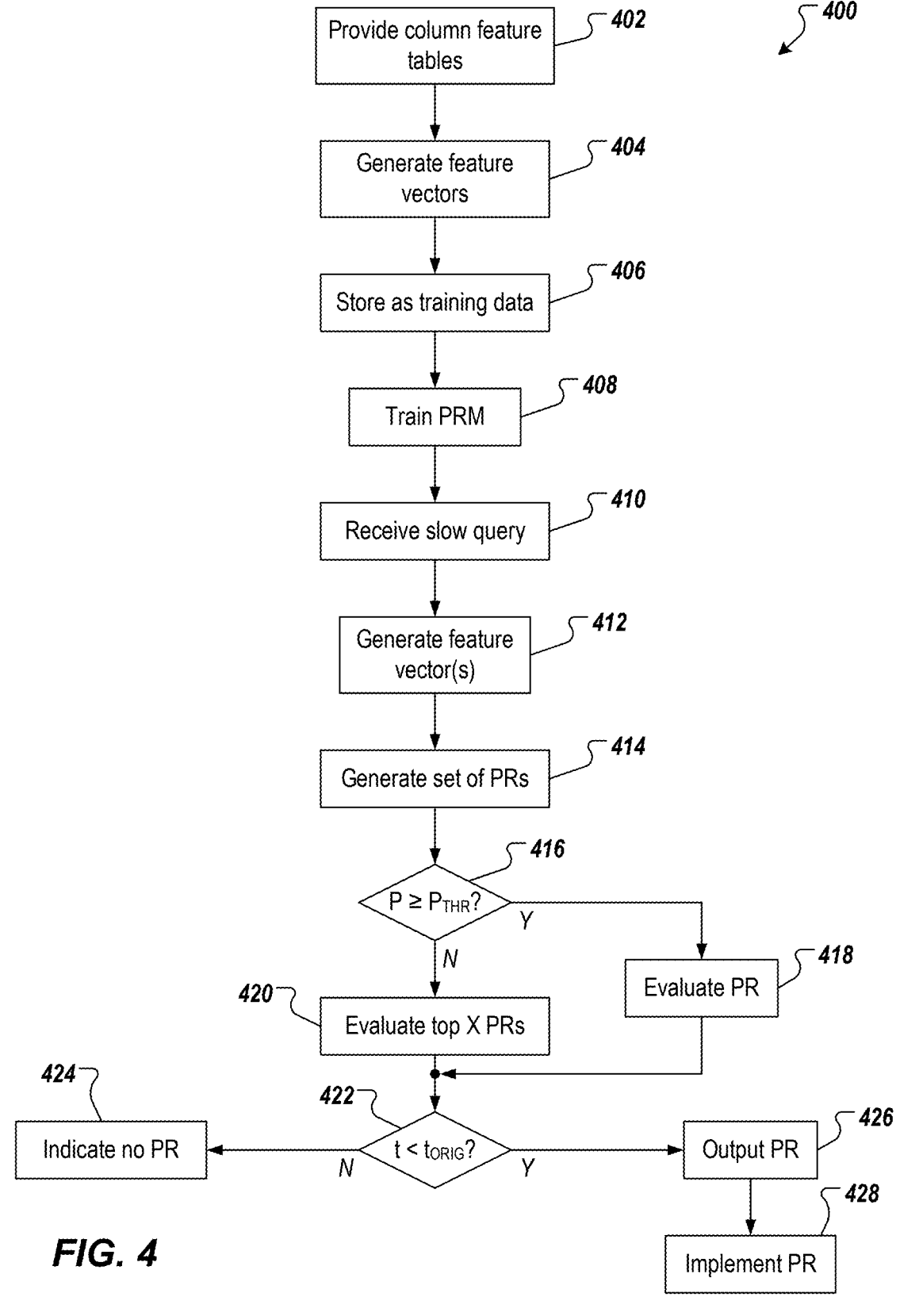
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

Column feature tables are provided (402). For example, and as described herein, the partition data definition module 204 processes historical queries in the query repository 220 to identify columns implicated by the historical queries and, for each column, retrieve column feature data from the table data repository 218. In some examples, the partition data definition module 204 calculates one or more values of dynamic features. The partition data definition module 204 provides a column feature table (e.g., the column feature table 300 of FIG. 3A). Feature vectors are generated (404) and the feature vectors and labels are stored as training data (406). For example, and as described herein, a feature vector can be provided for one or more columns represented in the column feature table (e.g., each feature vector is provided as a one-hot feature vector, in which, if a static feature or a dynamic feature is present for the respective column, a respective dimension is encoded with 1 and, if a static feature or a dynamic feature is absent for the respective column, a respective dimension is encoded with 0). In some examples, one or more columns are filtered from the column feature table (e.g., based on data size, row number), such that no feature vector is provided for filtered columns.

A PRM is trained (408). For example, and as described herein, the PRM 230 is trained as a RF model, where, during iterations of training, the PRM 230 processes feature vectors as input and, for each feature vector, predicts a class from a set of classes. If, for a feature vector, the predicted partition does not match the label assigned to the feature vector, further iterations of training can be executed.

A slow query is received (410) and one or more feature vectors is generated (412). For example, and as described herein, columns that are implicated in the slow query (e.g., columns $c1$, $c2$, $c3$, $v1$) are determined and, for each column, a feature vector is provided. For example, the vectorization module 212 can determine a set of columns (e.g., one or more columns) implicated by the query and can request (e.g., from the partition data definition module 204), for each column, column feature data (e.g., such as that represented in FIG. 3A). The vectorization module 212 can provide, for each column, a feature vector. A set of partition recommendations is provided for each feature vector (414). For example, and as described herein, each feature vector is processed by the PRM 230 executed by the inference module 214, and the PRM 230 outputs a set of classes, each class corresponding to a partition recommendation. In some examples, each class in the set of classes is associated with a respective probability provided by the PRM 230.

For a set of partition recommendations, it is determined whether any probability (P) meets or exceeds a threshold probability ($P_{THR}$) (416). If a probability meets of exceeds the threshold probability, the partition recommendation corresponding to the probability is output as a single partition recommendation for evaluation (418). If no probability meets of exceeds the threshold probability, the top X partition recommendations are evaluated (420). For example, and as described herein, the single partition recommendation or the top X classes (e.g., top 3 classes) are provided for evaluation by the evaluation module 216, which evaluates partition recommendations to determine, for each partition recommendation, an estimated performance. For example, the evaluation module 216 can include a sample library that can be described as a scaled-down version of the database system that the slow query resulted from. In some examples, the evaluation module 216 executes the slow query on the sample library using the partition recommendation or each of the top X partition recommendations to provide, for each recommended partition, an execution time.

It is determined whether at least one execution time (t) is less than an original execution time ($t_{ORIG}$) (422). For example, and as described herein, the execution time(s) determined by the evaluation module 216 is/are compared to an original execution time of the slow query. In some examples, the original execution time is determined by executing the slow query on the sample library without the partition recommendation(s). In some examples, the original execution time is the execution time that had originally resulted in the slow query being designated as slow. If no execution time is less than the original execution time, no partition recommendation is provided (424). If at least one execution time is less than the original execution time, a partition recommendation is output (426) and is implemented in the database system (428). For example, and as described herein, the table that includes the column that is the subject of the partition recommendation is partitioned based on the column and the partition type (e.g., RANGE, HASH, ROUND ROBIN) of the partition recommendation.

Figure 5:
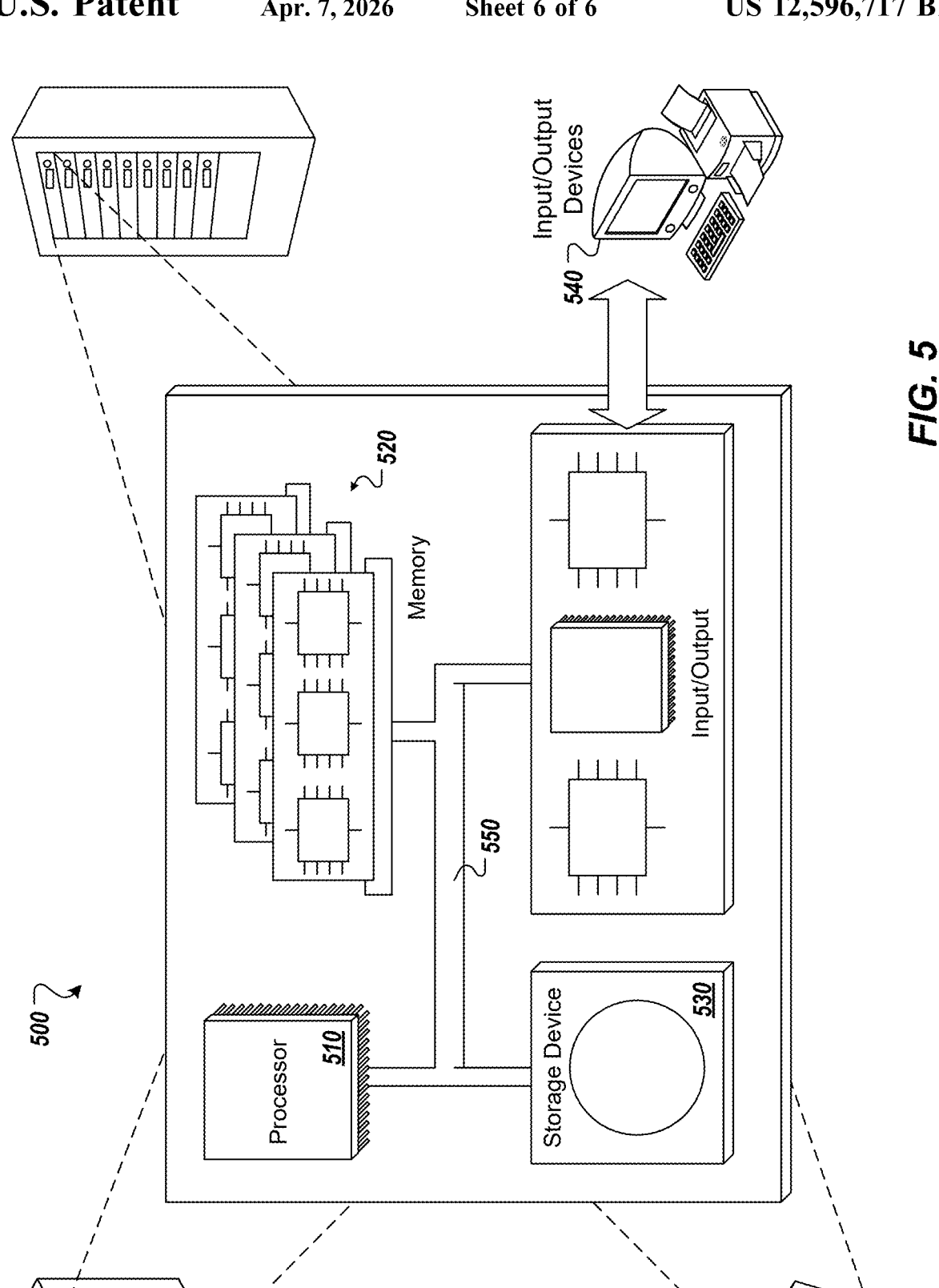
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for implementing partitions in cloud-based database systems, the method being executed by one or more processors and comprising:

for a historical query in a set of historical queries, determining a set of columns, the set of historical queries comprising queries that have been executed in a cloud-based database system;

for at least a sub-set of columns of the set of columns, generating a first set of feature vectors, each feature vector in the first set of feature vectors being associated with a label indicating a partition type;

providing a partition recommendation model by training using a plurality of sets of feature vectors that comprises the first set of feature vectors;

receiving, from a slow query repository, a slow query that is executed in the cloud-based database system, the slow query comprising a query that is designated as slow based on previous execution of the query within the cloud-based database system;

generating a second set of feature vectors representative of respective columns implicated by the slow query; and for a first feature vector in the second set of feature vectors:

processing the first feature vector by the partition recommendation model to provide a first set of partition recommendations, and implementing a first partition recommendation of the first set of partition recommendations as a first partition in the cloud-based database system.

2. The method of claim 1, wherein implementing a first partition recommendation of the first set of partition recommendation as a first partition in the cloud-based database system comprises determining that a probability associated with the first partition recommendation exceeds a threshold probability, and in response, outputting the first partition recommendation for implementation in the cloud-based database system.

3. The method of claim 1, wherein implementing a first partition recommendation of the first set of partition recommendation as a first partition in the cloud-based database system comprises:

processing each partition recommendation using a sample library to generate a set of execution results, the sample library being representative of data stored within the cloud-based database system; and selecting the first partition recommendation from the first set of partition recommendations based on the execution results.

4. The method of claim 1, further comprising, for a second feature vector in the second set of feature vectors:

processing the second feature vector by the partition recommendation model to provide a second set of partition recommendations, and determining not to implement any partition recommendations of the second set of partition recommendations in the cloud-based database system.

5. The method of claim 1, wherein each feature vector comprises an encoded representation of features of a respective column, in which each dimension corresponds to a feature, each feature comprising one or a static feature and a dynamic feature.

6. The method of claim 5, wherein each feature vector is generated using one-hot encoding.

7. The method of claim 1, wherein the slow query is designated as slow in response to determining that a query execution time exceeds a threshold query execution time.

8. The method of claim 1, wherein the partition recommendation model is a random forest model.

9. A non-transitory computer-readable storage medium coupled to one or more processors and having instructions stored thereon which, when executed by the one or more processors, cause the one or more processors to perform operations for implementing partitions in cloud-based database systems, the operations comprising:

for a historical query in a set of historical queries, determining a set of columns, the set of historical queries comprising queries that have been executed in a cloud-based database system;

for at least a sub-set of columns of the set of columns, generating a first set of feature vectors, each feature vector in the first set of feature vectors being associated with a label indicating a partition type;

providing a partition recommendation model by training using a plurality of sets of feature vectors that comprises the first set of feature vectors;

receiving, from a slow query repository, a slow query that is executed in the cloud-based database system, the slow query comprising a query that is designated as slow based on previous execution of the query within the cloud-based database system;

generating a second set of feature vectors representative of respective columns implicated by the slow query; and for a first feature vector in the second set of feature vectors:

processing the first feature vector by the partition recommendation model to provide a first set of partition recommendations, and implementing a first partition recommendation of the first set of partition recommendations as a first partition in the cloud-based database system.

10. The non-transitory computer-readable storage medium of claim 9, wherein implementing a first partition recommendation of the first set of partition recommendation as a first partition in the cloud-based database system comprises determining that a probability associated with the first partition recommendation exceeds a threshold probability, and in response, outputting the first partition recommendation for implementation in the cloud-based database system.

11. The non-transitory computer-readable storage medium of claim 9, wherein implementing a first partition recommendation of the first set of partition recommendation as a first partition in the cloud-based database system comprises:

processing each partition recommendation using a sample library to generate a set of execution results, the sample library being representative of data stored within the cloud-based database system; and selecting the first partition recommendation from the first set of partition recommendations based on the execution results.

12. The non-transitory computer-readable storage medium of claim 9, wherein operations further comprise, for a second feature vector in the second set of feature vectors:

processing the second feature vector by the partition recommendation model to provide a second set of partition recommendations, and determining not to implement any partition recommendations of the second set of partition recommendations in the cloud-based database system.

13. The non-transitory computer-readable storage medium of claim 9, wherein each feature vector comprises an encoded representation of features of a respective column, in which each dimension corresponds to a feature, each feature comprising one or a static feature and a dynamic feature.

14. The non-transitory computer-readable storage medium of claim 13, wherein each feature vector is generated using one-hot encoding.

15. A system, comprising:

a computing device; and a computer-readable storage device coupled to the computing device and having instructions stored thereon which, when executed by the computing device, cause the computing device to perform operations for implementing partitions in cloud-based database systems, the operations comprising:

for a historical query in a set of historical queries, determining a set of columns, the set of historical queries comprising queries that have been executed in a cloud-based database system;

for at least a sub-set of columns of the set of columns, generating a first set of feature vectors, each feature vector in the first set of feature vectors being associated with a label indicating a partition type;

providing a partition recommendation model by training using a plurality of sets of feature vectors that comprises the first set of feature vectors;

receiving, from a slow query repository, a slow query that is executed in the cloud-based database system, the slow query comprising a query that is designated as slow based on previous execution of the query within the cloud-based database system;

generating a second set of feature vectors representative of respective columns implicated by the slow query; and for a first feature vector in the second set of feature vectors:

processing the first feature vector by the partition recommendation model to provide a first set of partition recommendations, and implementing a first partition recommendation of the first set of partition recommendations as a first partition in the cloud-based database system.

16. The system of claim 15, wherein implementing a first partition recommendation of the first set of partition recommendation as a first partition in the cloud-based database system comprises determining that a probability associated with the first partition recommendation exceeds a threshold probability, and in response, outputting the first partition recommendation for implementation in the cloud-based database system.

17. The system of claim 15, wherein implementing a first partition recommendation of the first set of partition recommendation as a first partition in the cloud-based database system comprises:

processing each partition recommendation using a sample library to generate a set of execution results, the sample library being representative of data stored within the cloud-based database system; and selecting the first partition recommendation from the first set of partition recommendations based on the execution results.

18. The system of claim 15, wherein operations further comprise, for a second feature vector in the second set of feature vectors:

processing the second feature vector by the partition recommendation model to provide a second set of partition recommendations, and determining not to implement any partition recommendations of the second set of partition recommendations in the cloud-based database system.

19. The system of claim 15, wherein each feature vector comprises an encoded representation of features of a respective column, in which each dimension corresponds to a feature, each feature comprising one or a static feature and a dynamic feature.

* * * * *